US008817428B2

(12) United States Patent
Perez et al.

(10) Patent No.: US 8,817,428 B2
(45) Date of Patent: Aug. 26, 2014

(54) DIFFERENTIAL TEMPERATURE MONITORING OF ELECTRICAL DEVICES

(75) Inventors: Marcelo Perez, Franklin, TN (US); Jeffrey J. Farago, Franklin, TN (US)

(73) Assignee: Schneider Electric USA, Inc., Palatine, IL (US)

(*) Notice: Subject to any disclaimer, the term of this patent is extended or adjusted under 35 U.S.C. 154(b) by 72 days.

(21) Appl. No.: 13/218,906

(22) Filed: Aug. 26, 2011

(65) Prior Publication Data

US 2013/0050878 A1 Feb. 28, 2013

(51) Int. Cl.
H01G 2/14 (2006.01)
(52) U.S. Cl.
USPC .......................................................... 361/15
(58) Field of Classification Search
USPC .......................................................... 361/15
See application file for complete search history.

(56) References Cited

U.S. PATENT DOCUMENTS

| | | | |
|---|---|---|---|
| 3,534,227 A | 10/1970 | Price et al. | |
| 3,562,586 A | 2/1971 | Carter et al. | |
| 3,889,158 A * | 6/1975 | Peterson .......................... | 361/16 |
| 6,332,710 B1 * | 12/2001 | Aslan et al. .................... | 374/183 |
| 7,642,916 B2 | 1/2010 | Phipps et al. | |
| 7,726,184 B2 | 6/2010 | Cook et al. | |
| 7,755,489 B2 | 7/2010 | Georgescu et al. | |
| 2003/0023885 A1 * | 1/2003 | Potter et al. .................... | 713/300 |
| 2006/0262474 A1 * | 11/2006 | Chen et al. .................... | 361/103 |
| 2007/0191993 A1 * | 8/2007 | Wyatt ............................. | 700/299 |
| 2008/0037033 A1 * | 2/2008 | Ersue et al. .................... | 356/604 |
| 2008/0239608 A1 * | 10/2008 | Yoshitomi ..................... | 361/103 |
| 2009/0231764 A1 | 9/2009 | Banting et al. | |
| 2012/0265491 A1 * | 10/2012 | Drummy ........................ | 702/189 |

OTHER PUBLICATIONS

Moving average, Feb. 4, 2010, Wikipedia.com.*
Carol Maxwell & E.S. Gurdjian; F76350: Monitoring Battery Temperature Using an Adapted Temperature Sensor With Your Charger Can Increase the Life of Your House Batteries; (3 pages) (Prior to Jun. 29, 2011).
Xantrex; Xantrex LinkPro Battery Monitor Temperature Sensor Kit; dated May 2008; (1 page).
Temperature Alert; Server Room Temperature Monitoring Systems; downloaded Jul. 15, 2011; (3 pages).
Isensix; Wireless Temperature Monitoring Systems; downloaded Jul. 15, 2011; (1 page).
Industrial Assemblies; Industrial Temperature Sensors; downloaded Jul. 15, 2011; (2 pages).
EL-USB Series Product Highlights; EasyLog EL-USB Data Loggers; downloaded Jul. 15, 2011; (6 pages).
Welcome to 1-Wire.org; downloaded Jul. 15, 2011; (1 page).

* cited by examiner

*Primary Examiner* — Jared Fureman
*Assistant Examiner* — Kevin J Comber
(74) *Attorney, Agent, or Firm* — Lando & Anastasi, LLP (57) ABSTRACT

Systems, methods and devices for monitoring temperature are presented herein. A method of monitoring temperature in a system, such as a capacitor bank, is disclosed. The method may include: receiving first device temperature signals indicative of the temperature of a first device over a predetermined period of time; receiving second device temperature signals indicative of the temperature of a second device over a predetermined period of time; determining a first rolling average temperature for the predetermined period of time from the first device temperature signals; determining a second rolling average temperature for the predetermined period of time from the second temperature signals; and triggering a disconnect event in response to a determination that either the first or the second rolling average temperature is greater than a predetermined maximum working temperature.

20 Claims, 4 Drawing Sheets

| Description | Systems Health Status LED | Port LED 1 | 2 | 3 | 4 | 5 | 6 | 7 | 8 |
|---|---|---|---|---|---|---|---|---|---|
| No control power | Black | Black | Black | Black | Black | Black | Black | Black | Black |
| First Evaluation ongoing | Amber | Amber | Amber | Amber | Amber | Amber | Amber | Amber | Amber |
| Readings temperatures with no Issues | Green | Green | Green | Green | Green | Green | Green | Green | Green |
| Reader health Problem | Red | | | | | | | | |
| RF connection Issue | Green | Green | Green | Green | Black | Green | Green | Green | Green |
| Aged Capacitor detected | Amber | Green | Green | Green | Green | Amber | Black | Green | Green |
| Overheated Capacitor | Red | Green | Green | Green | Red | Green | | | |
| Overheated capacitor in port 3, with aged capacitor in port 4 and RF connection Issue in port 5 | Red | Green | Green | Red | Amber | Black | Green | Green | Green |
| Aged capacitor in port 4 and RD issue in port 5. | Red | Green | Green | Green | Amber | Black | Green | Green | Green |
| All ports working fine but there was an RF connection issue at one point in at least one port | Amber | Green | Green | Green | Green | Green | Green | Green | Green |
| Reader health problem | Red | Amber | Green | Green | Green | Black | Green | Green | Green |

Legend: ● Black, ◉ Amber, ⦸ Green, ◈ Red

FIG. 6

DIFFERENTIAL TEMPERATURE MONITORING OF ELECTRICAL DEVICES

TECHNICAL FIELD

The present disclosure relates generally to monitoring systems, and more particularly to systems, methods and devices for monitoring temperature.

BACKGROUND

Conventional utility networks supply utilities for commercial, residential and industrial purposes. In a typical electrical distribution system, for example, electrical energy is generated by an electrical supplier or utility company and distributed to consumers via a power distribution network. The power distribution network is often a network of electrical distribution wires (more commonly known as "electrical transmission lines") which link the electrical supplier to its consumers. Additional devices, such as bus bars, switches (e.g., breakers or disconnectors), power transformers, and instrument transformers, which are typically arranged in switch yards and/or bays, are automated for controlling, protecting, measuring, and monitoring of substations.

Typically, electricity from a power utility is fed from a primary station over a distribution cable to several local substations. At the local substations, the supply is transformed by distribution transformers from a relatively high voltage on the distributor cable to a lower voltage at which it is supplied to the end consumer. From the local substations, the power is provided to industrial users over a distributed power network that supplies power to various loads. Such loads may include, for example, various power machines, lighting, HVAC systems, etc.

In general, the power factor of a multi-phase alternating current (AC) electric power system is the ratio of the real (or "active") power used in a circuit to the apparent power used by the circuit. Real power, which is typically expressed in watts (W) or kilowatts (kW), is the capacity of the circuit for performing work in a particular time, whereas apparent power, which is typically expressed in volt-ampere (VA) or kilo volt-ampere (kVA), is the product of the current and voltage of the circuit. Power factor correction (PFC) can be achieved, for example, by switching in or out banks (or racks) of capacitors. A capacitor bank is typically composed of a number of discrete steps that can be switched in and out of operation. Each step is composed of a number of individual low-inductance capacitors that are wired in parallel (or series, depending upon the system), and sum together to provide the total capacitance for the step. In general, capacitor banks act to maintain a relatively constant power factor over a particular site or a portion of an electric distribution system to maximize the real power transfer capacity of the conductors and minimize the loses of the electric distribution system.

Power capacitors are naturally prone to aging effects that can change their electrical characteristics (e.g., capacitance, internal resistance, etc.), which in turn can reduce their effectiveness. Depending on the constituent materials, the design type, and the details of manufacturing, for example, some capacitors may be prone to different types of failure if their electrical characteristics change at a faster rate than expected from normal aging. In some cases, these failures can be mitigated by a self-protection mechanism, which is activated, for example, by overpressure, overtemperature, and/or overcurrent to responsively remove the capacitor from the circuit. Other cases may lead to a failure where the self-protection mechanism does not to operate properly.

It is common today for capacitor bank installations to have very limited or no monitoring and diagnostics available, due in part to limited available packaging space within the capacitor bank cabinet (or "locker") and the expense associated with monitoring the individual capacitors in a capacitor bank. As a result of this limited monitoring and diagnostics, it is very difficult to detect operational problems before they occur in order to mitigate operational concerns and minimize service disruption through regular maintenance efforts. However, in some applications, the use of sensors placed in intimate contact with a surface of the device being monitored can provide valuable information, e.g., for monitoring temperature, vibration, or deformation, that can be used, for example, to anticipate future problems. Consequently, there is a need for systems, methods and devices for monitoring temperature, vibration, and/or deformation in a capacitor bank.

SUMMARY

Aspects of this disclosure are directed to device management sensor systems that enable identification of a device and monitoring of a characteristic of the device, such as temperature, vibration, deformation, etc. Industrial devices can generate different levels of heat depending, for example, on working conditions of the system, environment and the health status of the device itself. For instance, a power factor correction capacitor bank can experience different temperature levels depending on the harmonic content of the electrical consumption, the ambient temperature, and the quality of the individual capacitors. Likewise, the temperature of an electrical transformer can be affected, for example, by the type of load, environmental temperature, and the quality and health of the unit. Temperature and vibration are each a key indicator of how the device is performing and being used. Temperature or vibration is often related to the useful life of a device and, thus, may be indicative of the need for maintenance or replacement of the device. The combination of identification of a device along with temperature, vibration, and/or electrical data provides useful information for preventive maintenance and performance calculations about a particular piece of equipment (or one or more subcomponents thereof). The logic and algorithms of embodiments presented herein provide a way to minimize or eliminate the risk of running the device beyond its normal design working temperature limits.

Historically, monitoring the temperature of each can in a capacitor bank was very expensive, inconvenient and impractical. A typical capacitor bank can employ anywhere from three cans to upwards of a thousand or more cans, making monitoring of the system too arduous and expensive to be justified. Capacitors may fail when subjected to voltages, currents, and/or harmonics beyond their respective ratings. Capacitors can also fail due to manufacturing issues. Monitoring the temperature of each capacitor in a bank as disclosed herein can help prevent failure of the capacitor bank. Systems and methods presented herein prevent the overheating of a capacitor can through advanced warnings, such as alarms based on temperature trends well before the situation becomes dangerous, and through integrated disconnect means. Furthermore, capturing and storing information as disclosed herein can provide evidence of the root cause of a failure and help determine whether the electrical system or the capacitor was to blame (i.e., eliminating responsibility of the capacitor supplier if the electrical system was in fact the source of the problem.)

Some of the distinctive benefits of one or more of the embodiments presented herein include, singly or in any logical combination: ease of installment; amenability for retrofit applications; minimal or no modification of the monitored equipment; low cost per monitoring point; small footprint; minimal setup and configuration requirements (e.g., system can configure itself); no sensor batteries; minimal wiring; reliable and long operational life expectancy; onboard logging (e.g., available for preventive maintenance or troubleshooting); and features for automatic alarming and disconnect of the equipment.

According to aspects of the present disclosure, a method is disclosed for monitoring temperature in a system with a plurality of temperature-sensitive devices. The method includes: receiving from a first sensor first temperature signals indicative of a temperature of a first device over a predetermined period of time; receiving from a second sensor second temperature signals indicative of a temperature of a second device over the predetermined period of time; determining a first rolling average temperature for the predetermined period of time from the first temperature signals; determining a second rolling average temperature for the predetermined period of time from the second temperature signals; and triggering a disconnect event in response to a determination that the first rolling average temperature or the second rolling average temperature is greater than a predetermined maximum working temperature.

The method may optionally further include: receiving from one or more ambient temperature sensors ambient temperature signals indicative of an ambient temperature proximate the capacitive elements over the predetermined period of time; determining an ambient rolling average temperature for the predetermined period of time from the ambient temperature signals; and triggering a warning event in response to a determination that the difference between the first/second rolling average temperatures and the ambient rolling average temperature is greater than a predetermined differential temperature (delta of temperature).

According to additional aspects of the present disclosure, a temperature monitoring system for a capacitor bank with a plurality of capacitor cans is presented. The monitoring system includes a plurality of contact temperature sensors, each of which is configured to contact the surface of one of the capacitor cans and therefrom generate a signal indicative of the temperature of that capacitor can. A reader device is operatively connected to the contact temperature sensors. The reader device is configured to: receive signals from the contact temperature sensors; determine, for each contact temperature sensor, a rolling average temperature from the respective signals received from that contact temperature sensor; determine if any rolling average temperature is greater than a predetermined maximum working temperature; and trigger a disconnect event in response to a determination that any of the rolling average temperatures is greater than the predetermined maximum working temperature.

According to other aspects of the present disclosure, a capacitor bank is disclosed. The capacitor bank includes a cabinet with two sets of tandem capacitor cans housed by the cabinet. The first and second sets of tandem capacitor cans are arranged generally parallel to one another. A temperature sensor assembly is interposed between the first and second sets of capacitor cans. The temperature sensor assembly includes an ambient temperature sensor and a plurality of contact temperature sensors. Each contact temperature sensor is in direct contact with a surface of a respective one of the capacitor cans to generate therefrom a signal indicative of the temperature of that capacitor can. A reader device is communicatively coupled to temperature sensor assembly. The reader device includes a processor and a memory device storing instructions to perform the following operations: receive signals from the contact temperature sensors; determine, for each contact temperature sensor, a rolling average temperature from the signals received from the contact temperature sensor; determine if any of the rolling average temperatures is greater than a predetermined maximum working temperature; determine if any of the rolling average temperatures is greater than a predetermined maximum normal operating temperature; trigger a disconnect event in response to any rolling average temperature being greater than the predetermined maximum working temperature; and trigger a warning event in response to all of the rolling average temperatures being less than the predetermined maximum working temperature and any of the rolling average temperatures being greater than the maximum normal operating temperature.

The above summary is not intended to represent each embodiment or every aspect of the present disclosure. Rather, the foregoing summary merely provides an exemplification of some of the novel features included herein. The above features and advantages, and other features and advantages of the present disclosure, will be readily apparent from the following detailed description of the embodiments and best modes for carrying out the present invention when taken in connection with the accompanying drawings and appended claims.

BRIEF DESCRIPTION OF THE DRAWINGS

The present disclosure is susceptible to various modifications and alternative forms. Specific embodiments are shown by way of example in the drawings and will be described in detail below. It should be understood, however, that the present disclosure is not intended to be limited to the particular forms disclosed. Rather, the present disclosure is to cover all modifications, equivalents, and alternatives falling within the spirit and scope of the invention as defined by the appended claims.

DETAILED DESCRIPTION OF ILLUSTRATED EMBODIMENTS

While aspects of the present disclosure are susceptible of embodiment in many different forms, there are shown in the drawings and will herein be described in detail representative embodiments of the present disclosure with the understanding that the present disclosure is to be considered as an exemplification of the various aspects and principles of the present disclosure, and is not intended to limit the broad aspects of the present disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise.

Figure 1:
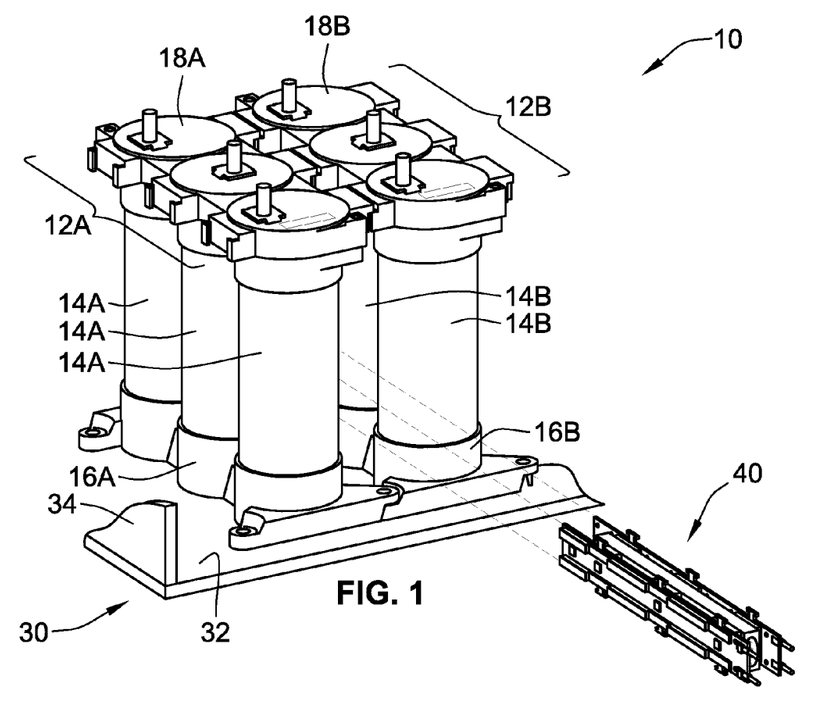
FIG. 1 is a perspective-view illustration of an example of a capacitor bank with a representative sensor assembly in accordance with aspects of the present disclosure.

Referring to the drawings, wherein like reference numerals refer to like components throughout the several views, FIG. 1 is a perspective-view illustration of a capacitor bank, designated generally as 10, in accordance with aspects of the present disclosure. The capacitor bank 10 is represented herein by a number of illustrative components, including a first set of tandem capacitor cans 12A in opposing relation to a second set of tandem capacitor cans 12B. The first set of capacitor cans 12A includes three cylindrical capacitor elements (also referred to herein as "capacitor cans") 14A that are spaced from and generally parallel to three cylindrical capacitor elements 14B of the second set of capacitor cans 12B (only two of which are visible in FIGS. 1 and 2, but the third is visible in FIG. 3). A respective support base 16A and 16B interconnects each set of capacitor cans 12A, 12B, respectively, along the bottom ends thereof, while a cover or "cap" 18A, 18B interconnects the capacitor cans 14A, 14B in each set 12A, 12B, respectively, along top ends thereof. Each capacitor can 14A, 14B can be a single-phase capacitor element such that each set 12A, 12B constitutes a 3-phase capacitive element.

The first and second sets of tandem capacitor cans 12A, 12B can be indicative of an entire capacitor module (commonly referred to as a "step") or an entire capacitor bank, or just a representative portion thereof. In that vein, the features of the present disclosure are not limited to the single module, two set, six-can implementation presented in FIGS. 1-3. Rather, these features are similarly amenable to capacitor banks with more than one capacitor module, each capacitor module comprising greater or fewer than two sets of capacitor cans, each set comprising greater or fewer than three capacitor elements.

Figure 2:
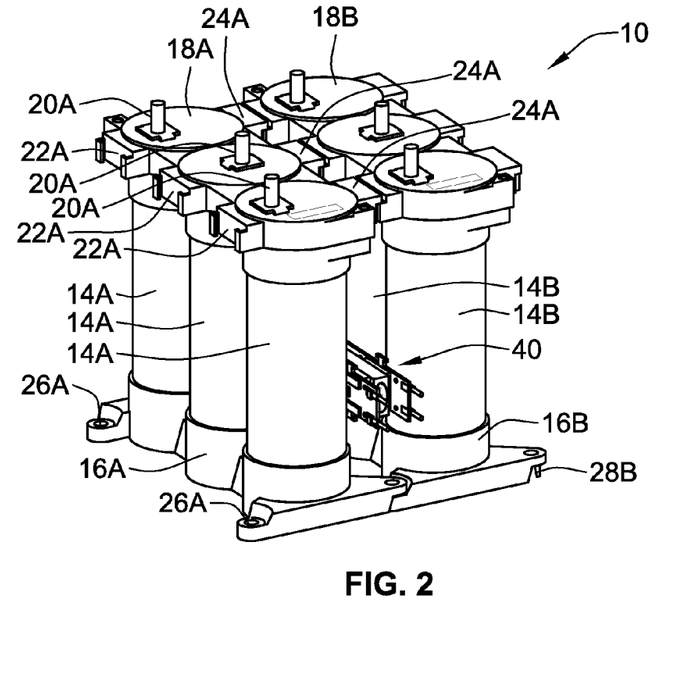
FIG. 2 illustrates the representative sensor assembly of FIG. 1 installed between two sets of capacitor cans within the exemplary capacitor bank.
Figures 3, 4:
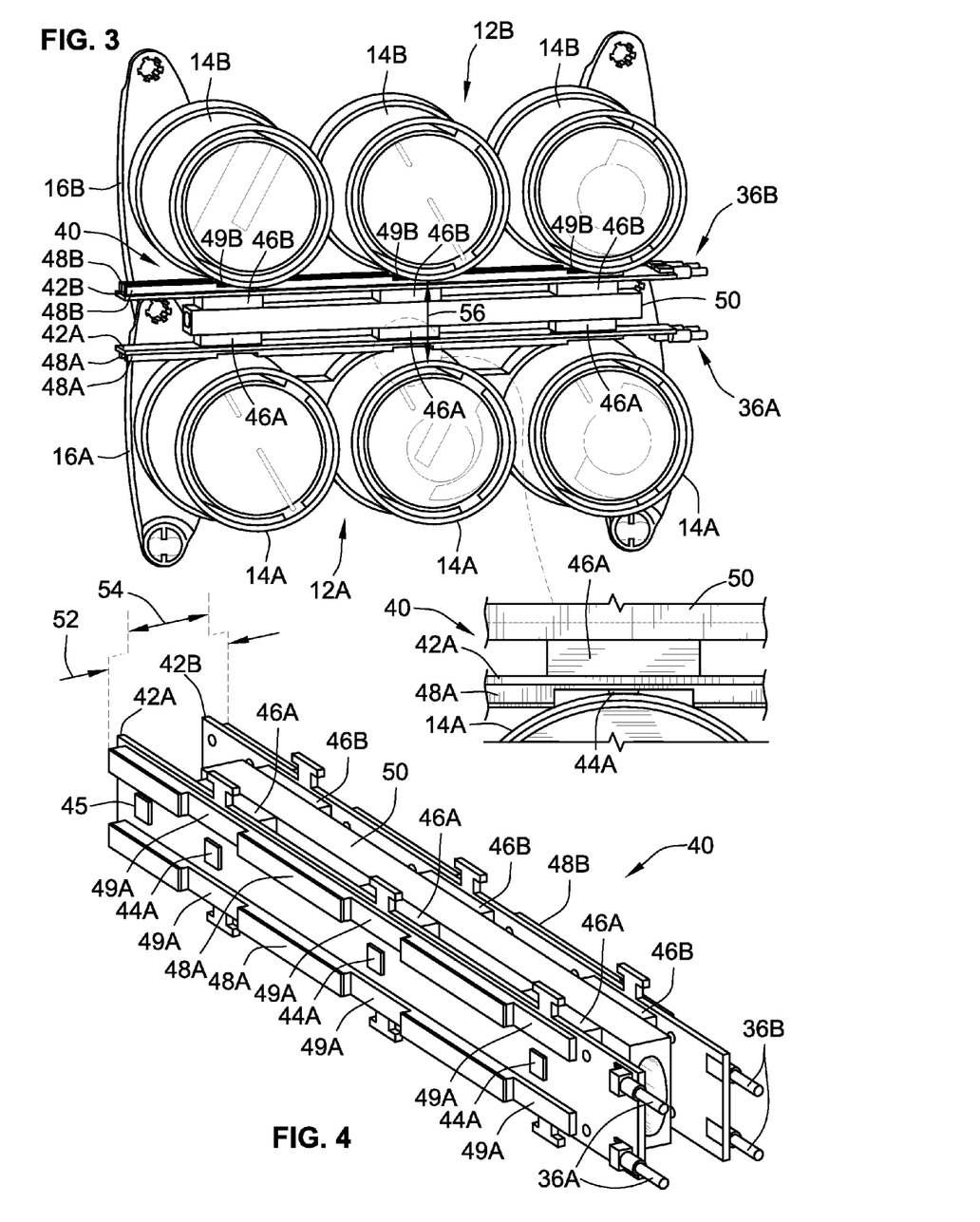
FIG. 3 is a top perspective-view illustration of the exemplary capacitor bank of FIG. 1 with the capacitor caps removed to show the sensor assembly in intimate contact with and attached to a number of the capacitor cans.
FIG. 4 is a perspective-view illustration of an exemplary sensor assembly according to aspects of the present disclosure.

Although not necessarily required to practice the aspects of the present disclosure, the first and second sets of tandem capacitor cans 12A, 12B illustrated in FIGS. 1-3 are substantially structurally identical; thus, for brevity and conciseness, additional features of the two sets 12A, 12B will be described with respect to the first set of capacitor cans 12A shown in FIG. 2. During normal operation, the two sets of capacitor cans 12A, 12B are mechanically and electrically coupled together. For example, each of the capacitor cans 14A includes an electrically conductive power terminal 20A that projects upwardly from the capacitor cap 18A. The terminal 20A of each can 14A is electrically coupled to the terminal of an adjacent capacitor can 14B in the second set 12B, for example, via an elongated electrical interconnection bar that is secured in place by a nut and contact washer (none of which are shown). Protective covers (not shown) can be attached to the capacitor caps 18A, 18B to shield the terminals 20A from tampering and the surrounding environment. It is certainly envisioned that alternative means could be employed to electrically couple the various capacitor cans 14A, 14B shown in the drawings.

In the illustrated embodiment, three female guide slots 22A, which are disposed on a first side of the capacitor cans 14A, project laterally from the capacitor cap 18A. Complementary male slide-rails 24A are disposed on a second side of the capacitor cans 13A, projecting laterally from the capacitor cap 18A in the opposite direction of the female guide slots 22A. Additionally, the support base 16A is provided with a pair of fixing holes 26A on the first side of the capacitor cans 14A subjacent the female guide slots 22A, and a pair of fixing posts (not visible on the first support base 16A, but shown in FIG. 2 at 28B) protruding downward from the support base 16A on the second side of the capacitor cans 14A subjacent the male slide-rails 24A. FIGS. 1 and 2 show that the first and second sets of tandem capacitor cans 12A, 12B are mechanically connected by aligning and sliding each of the male slide-rails 24A on the first capacitor cap 18A into a corresponding female guide slot of the second capacitor cap 18B. In so doing, the fixing posts on the support base 16A of the first set 12A are aligned with and received by a corresponding fixing hole in the support base 16B of the second set 12B. Each set of tandem capacitor cans 12A, 12B can be fastened to or otherwise supported on a shelf 32 inside a capacitor bank cabinet 30 next to and generally parallel with the cabinet side walls 34. The mechanical attachment means discussed above are exemplary in nature, and should in no way be construed as necessary limitations.

Only selected components of the capacitor bank 10 have been shown and were described in detail hereinabove. Nevertheless, the capacitor bank 10 can include numerous additional components, such as a control module, a fuse assembly, a switching module, a reactor, safety doors on the cabinet, cable harnesses, racking units, relays, and other well known peripheral components. Seeing as these components are well known in the art, they will not be described in further detail herein.

In the illustrated embodiment, each of the sets 12A, 12B in the capacitor bank 10 is composed of one or more individual capacitor elements that are wired in parallel. In the electrical utility context, the capacitor bank 10 can be based on, for example, REACTIVAR™ AV4000 and AV5000 Standard Automatic Power Factor capacitor banks, the REACTIVAR™ AV6000 Anti-Resonant Power Factor capacitor bank, or the REACTIVAR™ Medium Voltage Automatic Power Factor Correction banks, all of which are available from Schneider Electric USA, Inc. Likewise, the individual capacitors 14A, 14B are shown as VARPLUS$^2$™ LV capacitors, but could also be based on other capacitor configurations, such as REACTIVAR™ dry fixed capacitors and REACTIVAR™ MVC fixed capacitors, all of which are also available from Schneider Electric.

A sensor assembly, which is designated generally at 40 in FIGS. 1-3, is shown being inserted into (FIG. 1) and mounted on (FIG. 2) the capacitor bank 10. Generally speaking, the sensor assembly 40 is designed for monitoring a characteristic of a device (or "device"). By way of non-limiting example, the sensor assembly 40 can be designated as a temperature sensor assembly for monitoring the temperatures of the individual capacitors cans 14A, 14B in the capacitor bank 10, as developed further below. However, the sensor assembly 40 can be utilized to monitor a variety of different characteristics, singly or in combination, and can be employed to monitor alternative devices besides capacitor cans without departing from the scope and spirit of the present invention. For example, the sensor assembly 40 could also be designed to monitor vibration, deformation, current, etc. In addition, the sensor assembly 40 can be employed to monitor other devices, including electrical devices, such battery modules in a battery bank, reactors, solenoids, electrical motors, generators, solar cells, transformers, etc., mechanical devices, such as bearings, brake sets, clutches, transmissions, etc, and chemical devices, such as fuel cells, reactors, electrolytic-based devices, galvanic devices, etc.

With reference to FIGS. 3 and 4, the sensor assembly 40 includes at least one, and sometimes preferably two opposing substrates 42A and 42B. Depending, for example, on the intended application, such as a "wireless" scenario, the first and second substrates 42A, 42B are elongated panels formed from a rigid polymer which are oriented in a generally parallel, opposing spaced relation to one another. Alternatively, each of the substrates 42A, 42B can include a printed circuit board (PCB), which provides a path for transmitting "outgoing" signals—i.e., those generated by the sensors, and, in some applications, provides a path for "incoming" signals, such as those generated by an Intelligent Electronic Device (IED) for regulating the sensor 40. These "paths" can be provided, for example, by way of electrically conductive pathways, tracks, or signal traces that are etched from copper sheets and laminated onto a non-conductive substrate by an epoxy resin. In a "wired" scenario, the substrates 42A, 42B can also include connectors 36A and 36B, which are represented herein by SMA (SubMiniature version A) coax connectors, for transmitting input and/or output signals via wires/cables, which connect, for example, to a monitoring device and a data collection system (e.g. via a concentrator box). In a "wireless" scenario, these connectors 36A, 36B can be replaced, for example, by transmitters or transceivers. A mounting layout that is compatible with the sensor chip or package footprint would allow for attachment to the substrate via soldering, as well as, provide repeatable and accurate positioning of the sensors. Adhesives, snap connections, and other attachment means are also available other than the aforementioned soldering method.

A sensor is mounted to each of the substrates 42A, 42B. In the illustrated embodiment, for example, a first plurality of contact temperature sensors 44A is integrated into and evenly spaced longitudinally along the first substrate 42A. Similarly, a second plurality of contact temperature sensors (not visible in the views provided, but similarly oriented and configured as the sensors 44A) is integrated into and evenly spaced longitudinally along the second substrate 42B. The contact temperature sensors (or "tags") 44A are positioned along the panels 42A, 42B such that each sensor 44A aligns for contact with a respective one of the capacitor cans 14A, 14B when the sensor assembly 40 is inserted into and mounted on the capacitor bank 10. Each of the sensors 44A is configured to directly (or intimately) contact an outer surface of a respective capacitor can 14A, 14B and therefrom generate a signal indicative of the characteristic being monitored (e.g., the individual temperatures of the cans 14A, 14B), as illustrated by the enlarged inset-view in FIG. 3. In other words, the three sensors 44A mounted to the first substrate 42A each contacts a single one of the capacitor cans 14A in the first set 12A, whereas the three sensors mounted to the second substrate 42B each contacts a single one of the capacitor cans 14B in the second set 12B. Optionally, an ambient temperature sensor (or "tag") 45 can be attached to each of the substrate(s) 42A, 42B, displaced from and not contacting the capacitor cans 14A, 14B. Improved contact between the tags and the device being monitored can be facilitated through the use of an intermediary thermally conductive pad or compound (e.g. silicone rubber, grease, gel).

The sensors can take on a variety of different forms, individually and collectively, depending, for example, on the characteristics being monitored by the sensor assembly 40. In some embodiments, the sensors 44A are radio frequency (RF) surface acoustic wave (SAW) sensing devices. One type of RF SAW temperature sensor is disclosed in U.S. Pat. No. 7,434,989 B2, to Solie, which is incorporated herein by reference in its entirety. Additional information regarding SAW type temperature sensors can be found in the following articles, both of which are incorporated herein by reference: E. Benes, M, Groschl, F. Seifert, "Comparison Between BAW and SAW Sensor Principles," IEEE Trans. Ultrasonics, Ferroelectrics, and Frequency Control, Vol. 45, 1314 (1998). L. Reindl, et al., "Wireless Measurement of Temperature using Surface Acoustic Waves Sensors," IEEE Trans. Ultrasonics, Ferroelectrics, and Frequency Control, Vol. 51, 1457 (2004). General information regarding other contact temperature sensors can be found in U.S. Pat. No. 5,527,111, to Heinrich Lysen et al., and U.S. Pat. No. 4,859,081, to Seishiro Kabayashi. It is also envisioned that other types of temperature sensing devices be incorporated into the sensor assembly 40, such as thermocouples or resistive thermal devices (RTDs). In a wireless configuration, energy harvesting devices (based on heat or electric field, for example) could be employed to power the sensors. Other types of sensors could be employed, such as vibration sensors, or contact pressure sensors in conjunction with, or independent of the temperature sensors. The board mounting layout provides repeatable and highly accurate positioning of the sensors 44A (e.g. accurately matched with the centerline spacing of subject monitored devices). The substrates 42A, 42B provide a consistent surface that can be pressed against the device(s) being monitored, thereby placing the sensors in intimate contact with the device surface(s). Recognizably, the sensor assembly 40 can include greater or fewer than six sensors 44A that are mounted similarly or differently to the configuration presented in FIG. 4.

Radio frequency surface acoustic wave (RFSAW) technology can provide an economical way of identification and monitoring for electrical equipment. Use of RFSAW sensors can eliminate the need for batteries at the sensor side. Once the RFSAW sensor tag is installed on the equipment, the sensor can provide many years of maintenance-free useful life. For new equipment, the RFSAW tags can be integrated into the actual capacitor cans or racking for a more streamlined installation. This system can consist of either a wired or a wireless connectivity scheme. The influence of metallic barriers, inconsistent device spacing, and other factors, may dictate the preference of wired versus wireless installations.

At least one, and in some embodiments a number of biasing members 46A and 46B are attached to one or more of the substrates 42A, 42B. As shown in the exemplary embodiment of FIGS. 3 and 4, a hollow but rigid retainer 50 is generally parallel to and located in between the first and second substrates 42A, 42B. A first plurality of biasing members 46A, in the nature of compressible foam blocks, attaches the first substrate 42A substrate to a first side (or face) of the rigid retainer 50, whereas a second plurality of biasing members 46B, also in the nature of compressible foam blocks, attaches the second substrate 42B to a second side (or face) of the rigid retainer 50 on the opposite side of the first substrate 42A. The individual foam blocks 46A, 46B, which can be molded, cast, die cut, etc., can be attached to the retainer 50 and respective substrates 42A, 42B, for example, via adhesives, including air-cured adhesives, light-cured adhesives, heat-cured adhesives, moisture-cured adhesives and epoxy-based adhesives. As an additional or alternative option, the foam blocks 46A, 46B can be attached to the retainer 50 and respective substrates 42A, 42B via fasteners, clamps, or other mechanical devices, independently or in combination with an adhesive.

A pair of elastomeric guide rails 48A and 48B can be attached to each of the substrates 42A, 42B, respectively. Each of the guide rails 48A, 48B is shown disposed on an opposite side of the sensors 44A. Each guide rail 48A, 48B, which extends the length of the sensor assembly 40, includes recessed sections 49A and 49B that are longitudinally spaced along the substrate 42A, 42B to align with and nest therein one of the capacitor cans 14A, 14B. As seen in FIG. 4, for example, the centerline location of each recessed section 49A, 49B is generally aligned with the position of a corresponding sensor 44A. The recessed section 49A, 49B can also be contoured to generally conform to the shape of the surface of the device(s) being monitored. Optionally, different sections of the guide rails 48A, 48B can incorporate different materials with different coefficients of friction. For example, the outermost surface of the rails 48A, 48B could be made of a harder material with a lower coefficient of friction, while the surfaces of the recessed sections 49A, 49B could be made of a softer material, such as silicone foam, which has a higher coefficient of friction providing better "grip."

The biasing member(s) 46A, 46B are configured to contract, such that the overall width 52 (FIG. 4) of the sensor assembly 40 narrows, allowing for insertion thereof between the device(s) being monitored and an adjacent support surface (which may be a neighboring device(s)). Once the sensor assembly 40 is in place, the biasing member(s) 46A, 46B are configured to expand, such that the substrates 42A, 42B press outwardly against the device(s), securing the sensor assembly 40 in place between the device(s) and adjacent surface. In the temperature sensor assembly example presented above, the biasing members 46A, 46B can be pressed inwardly towards one another, for example, through the application of a compressive force by a user. In so doing, the initial width 52 of the sensor assembly 40, which is larger than the gap distance 56 (FIG. 3) between the two sets of tandem capacitor cans 12A, 12B, is condensed to a reduced width (represented in FIG. 4 at 54), which is less than the gap distance 56. Reducing the width 52 of the sensor assembly 40 to the reduced width 54 allows the sensor assembly 40 to be inserted between (or be removed from) the sets of capacitor cans 12A, 12B. When the sensor assembly 40 is operatively positioned, as seen in FIG. 3, for example, the compressive force being applied to the biasing member(s) 46A, 46B is removed, which allows the biasing member(s) 46A, 46B to expand and push the opposing substrates 42A, 42B outwardly away from one another and press the sensors 44A and guide rails 48A, 48B into contact with the capacitor cans 14A, 14B. By this means, the sensor assembly 40 tensioned against and thereby secured between the first and second sets of tandem capacitor cans 12A, 12B. In some embodiments, the substrates 42A, 42B can therefore be characterized by an absence of structure designed to mechanically fasten the sensor assembly 40 to the device capacitor cans 14A, 14B.

Figure 5:
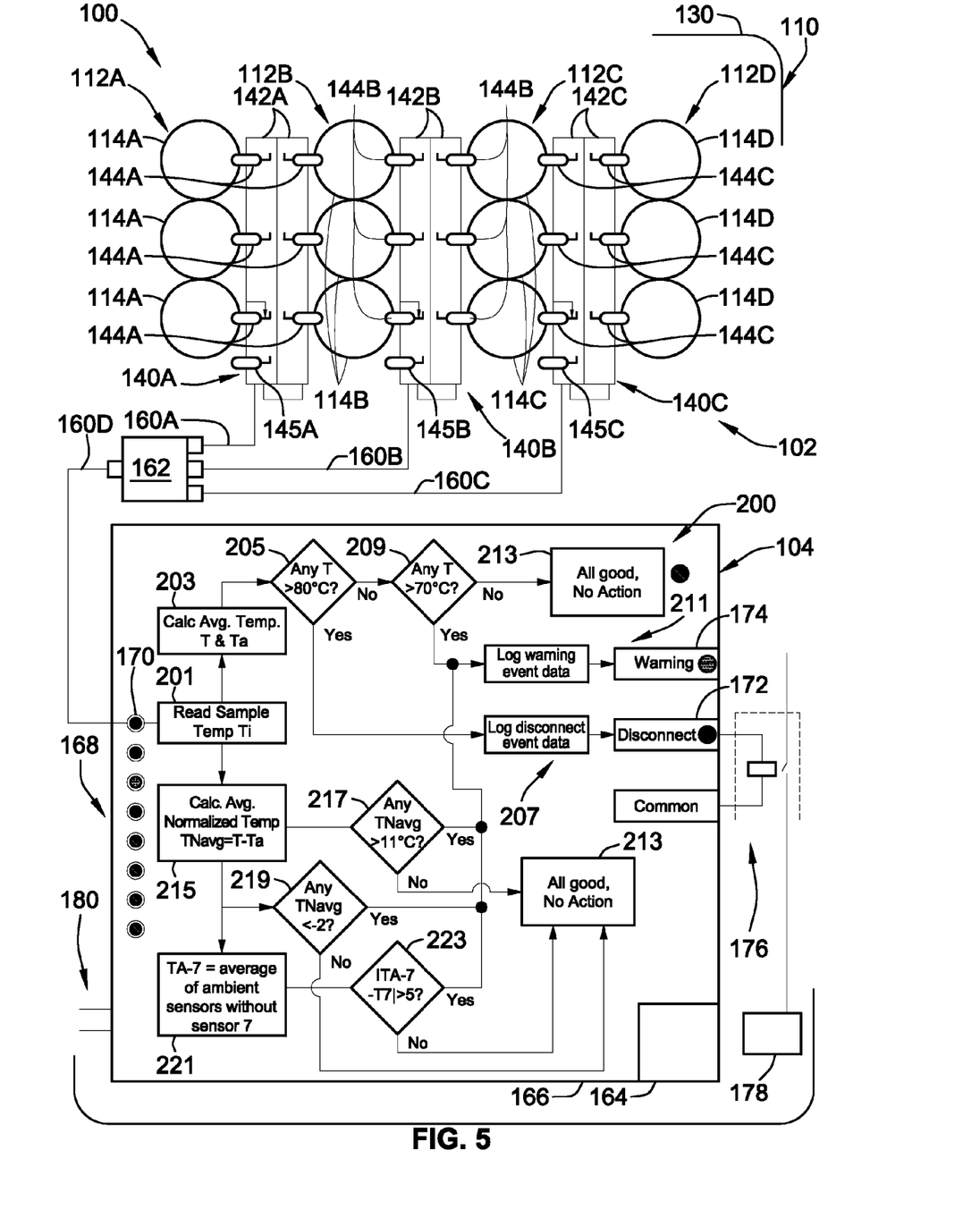
FIG. 5 is a schematic diagram illustrating a representative device management sensor system in accordance with aspects of the present disclosure.

FIG. 5 is a schematic diagram illustrating a representative device management sensor system, designated generally as 100, in accordance with aspects of the present disclosure. In the illustrated embodiment, the representative device management sensor system 100 is portrayed as a temperature monitoring system (and will therefore be referred to hereinafter as such) for analyzing and regulating operation of a number of capacitive elements 114A, 114B, 114C, 114D (also referred to herein as "capacitor cans") in a capacitor bank 110. Nevertheless, the novel and inventive aspects of the present disclosure are not so limited, and may be applied to monitor other characteristics (e.g., vibration, deformation, etc.) of other devices (e.g., batteries, transformers, etc.).

The capacitor bank 110 is represented herein by a number of illustrative components, including four sets of (three) tandem capacitor cans 112A, 112B, 112C and 112D that are stored inside a cabinet 130 in opposing, spaced relation to one another. The capacitor bank 110 can be similarly configured to the capacitor bank 10 of FIG. 1, and is therefore amenable to the same options, features and alternatives. For example, the capacitor bank 110 can include greater or fewer than four sets of capacitor cans, each of which may comprise greater or fewer than three capacitive elements.

The temperature monitoring system 100 comprises two primary subsystems: a sensor array 102 and a reader device 104. The sensor array 102 is represented herein by three sensor assemblies 140A, 140B and 140C. Each of the sensor assembles 140A-C can be structurally and functionally similar to the sensor assembly 40 described above with respect to FIGS. 1-4. For instance, each sensor assembly 140A-C of FIG. 5 includes a pair of opposing substrates 142A, 142B, and 142C, respectively, that cooperatively support a number of contact temperature sensors 144A, 144B and 144C, respectively, and a respective ambient temperature sensor 145A, 145B and 145C. Each contact temperature sensor 142A-C is configured to contact one of the capacitor cans 114A-D, and therefrom generate signals indicative of the individual temperature of that can. In contrast, each of the ambient temperature sensors 145A-C is configured to generate signals indicative of an ambient temperature proximate (e.g., within the same cabinet or on the same shelf or within a predetermined number of inches) one or more of the capacitor cans 114A-D. The sensor assemblies 140A-C of FIG. 5 are communicatively coupled to the reader device 104 via coax cables 160A, 160B and 160C, respectively, an intermediate splitter 162, and a connector coax cable 160D. However, as described above with respect to the sensor assembly 40, the sensor assemblies 140A-C can be operatively coupled to the reader 104 by any means now known or hereinafter developed.

The sensor assemblies 140A-C are relatively small and can be mounted in many different ways, with minimum intrusion to the equipment that is being monitored. Nevertheless, the sensor assemblies disclosed herein are purely representative in nature; as such, many aspects of the present disclosure are not per se limited to the sensor assemblies 40, 140A, 140B, 140C illustrated in the drawings, and can be practiced with other sensor arrangements. Non-limiting examples of some such optional sensor arrangements are disclosed in commonly owned U.S. patent application Ser. No. 13/171,764, which was filed on Jun. 29, 2011, and is incorporated herein by reference in its entirety. In addition, the number of sensor assemblies 140A-C and/or the number of sensors borne by each sensor assembly can be varied from that shown in the drawings, for example, depending on the number and orientation of the capacitive elements being monitored. In some embodiments, the sensor array 102 includes 24 sensor assemblies with seven total sensors (or "tags") each, for a total of 168 tags.

With continued reference to FIG. 5, the reader 104 may provide the functionality of reading the individual temperature tags 144A-C and 145A-C, evaluating the status of each can 114A-114D in the cabinet 130, and predicting a potential capacitor failure in advance of the actual occurrence. The reader 104 includes a processor 164 and a memory device 166 for storing instructions to perform numerous operations, some of which will be developed in further detail below. These instructions may come in the form of computer software that is stored on one or more non-transitory computer-readable media. This software interface can support basic configuration of the system, and allow for downloading of onboard data logs to an external computing device (e.g., a PC). It can also allow the reader to perform system setup and take real time readings (e.g., tag ID, time stamping, temperature measurements from each tag, port status indication, etc.).

The reader 104 can also have minimum firmware functionality requirements, including taking real-time temperature reading from every tag in the system (e.g., readings from 168 tags every 5 minutes for a 24-hour period with +/−0.5 degrees Celsius error and no data loss). The firmware functionality requirements may also include performing necessary calculations, evaluation and control for warning events and disconnect events, and control of LED indicator functionality. In some embodiments, it may be ideal to maintain under 70% processor utilization with firmware calculating the normalized temperatures and performing the real time evaluation for a minimum of two levels of alarms (e.g., "warning" and "disconnect"), with processor utilization available for verification via a diagnostic function in the firmware or a code profiling module that can create a graphical representation of the processor utilization during code execution. The reader 104 can be preconfigured with all necessary software and parameter settings, eliminating the need for field setup. Optionally, the reader 104 can be custom configured with specific parameters (e.g., limit parameters, like the temperature thresholds for each alarm level) which can be defaulted or can be customized onsite by an operator.

The reader 104 can have a relatively small footprint—only 250 mm (9.8 in)×140 mm (5.5 in)×60 mm (2.4 in), in some embodiments, and only 178 mm (2 in)×127 mm (5 in)×51 mm (2 in), in some embodiments, thus requiring minimal packaging space. As seen in FIG. 5, the reader 104 includes a plurality of ports 168—e.g., eight radio frequency (RF) antenna ports each capable of reading a minimum of 21 tags, each with a dedicated tri-colored LED indicator 170. Power can be provided by a 24-volt direct current (VDC) DIN rail-mounted control power source 180. The reader 104, as portrayed in FIG. 5, also includes a "Disconnect" output 172 and a "Warning" output 174. The disconnect output 172 may be a normally high digital output that provides 24 VDC with a minimum of 250 mA to source an external relay 176. In this instance, when the reader 104 is in "normal conditions" (e.g., there is no disconnect event), the disconnect output 172 will be ON (closed). When a "disconnect event" is triggered, the disconnect output 172 is turned OFF (open), which may act to disconnect a controller 178 (and, thus, the capacitor bank 110), one or more modules within the capacitor bank 110, one or more selected sets of capacitors 114A-C, etc. The warning output 174 may be a normally high digital output that provides 24 VDC with a minimum of 250 mA to source an external relay 176. In this instance, when the reader 104 is in "normal conditions" (e.g., there is no warning event), the warning output 174 will be ON (closed). When a "warning event" is triggered, the warning output 174 is turned OFF (open), which may include indicating that the system is in a "Warning" condition via a GSM gateway.

Other optional features can include: a health-status tri-color LED output, a restart button, a communication port (e.g., USB, RS-232, etc.), a connection for remote LED indicators, a smart terminator for reader ports, a smart terminator for splitter module (e.g., A, B & C types), and mechanical DIN rail mounted relays (e.g., rated for 400 VAC). The restart button can be operable to start (or restart) the reader calculations, for example, after a Disconnect event has frozen the calculations or after the replacement of a failing capacitor(s). The restart button can also be operable to energize the cabinet and reset the "Disconnect" and "Warning" status, but generally will not reset or clear any logs. The restart button can also be operable to re-evaluate the status of the LED indicators so if one of the indicators was latched, a new evaluation will dictate the new LED status. The communication port may be used to setup the reader 104 and to communicate with a PC software for real-time temperature readings, system troubleshooting, and retrieving of onboard logs. It may be preferable to use Modbus RTU as the standard protocol for such communications. The connection for remote LED indicator can comprise a fiber optic cable that will extend the light of the Health Status LED to a maximum distance, for example, of approximately 10 ft.

According to additional aspects of the present disclosure, the reader 104 can be operable to "auto detect" all connected sensors and configure itself for the connected sensors without requiring an operator to program the reader 104. In addition, the reader 104 can be configured to automatically identify all connected sensor assemblies 140A-C in the capacitor bank 110, and automatically identify the combination of sensors 144A-C and 145A-C associated with each sensor assembly 140A-C. A "warning event" may be triggered in response to a determination that one of the identified combinations of sensors does not correspond to a predetermined expected sensor combination. For example, in FIG. 5, the only possible combinations of sensors, including their respective tag IDs, are: six contact sensors 144A and one ambient temperature sensor 145A for the first sensor assembly 140A; six contact sensors 144B and one ambient temperature sensor 145B for the second sensor assembly 140B; and six contact sensors 144C and one ambient temperature sensor 145C for the third sensor assembly 140C. If any other combination is present, or one or more tag IDs are missing, the reader 104 can be operable to trigger a "warning event." One such warning event may include, in any combination, outputting a visual indication of the error (e.g., changing a health status LED to amber), generating an electronic indication of the error (e.g., turning on the warning output relay), and storing relevant data in the memory device 166 (e.g., temperatures readings are recorded in an event data log with time stamping and an event description.)

In some embodiments, the system is generally unaffected by undervoltage situations, power cycles, or temperature variations within predetermined specifications. In some embodiments, the temperature monitoring system is available as a "safety kit" comprising a sensor array 102, a reader device 104, and connecting wires 160A-C. It may be preferable that the reader 104 be packaged inside the cabinet 130, as shown in FIG. 5; however, the reader 104 can optionally be mounted remote from the cabinet 130 and sensor assemblies 140A-C.

Each port 168 is the connecting point for a respective coaxial "splitter" cable 160D, communicatively coupling the reader 104 to the sensor array 102. Each port 168 may include a plug-in coaxial connector and a tri-color LED 170. The LED's 170 can provide a visual indication of the following statuses:

OFF—Indicates that the port is out of service and there is no terminator in the port. In some embodiments, a port should be terminated when not in use.

GREEN—Indicates that the port is in service and functioning and with no detected events. Optionally, ports with a terminator can also show a green LED when functioning correctly.

AMBER—Indicates that the port is in service and there is a "Warning" event associated with a sensor connected to the port.

RED—Indicates that the port is in service and there is a "Disconnect" event associated with a sensor connected to the port.

In some embodiments, indicators with green or no light can be reevaluated in real time ("not latched"), whereas amber can be changed to red or no light in real time, but cannot change to green without pressing the restart button ("latched"). In this regard, red can be latched and may not be changed to any other color unless the restart button is pressed.

The following parameters can be defined and stored in non-volatile memory for use by the reader 104:

| Description | Name | e.g. | |
|---|---|---|---|
| Maximum Working Temperature | TCmax | 80 | °C. |
| Warning Temperature | TCw | 70 | °C. |
| Maximum Normalized Temperature | TNavgMax | 11 | °C. |
| Maximum Negative Normalized Temperature (delta when capacitor is cooler than ambient) | TNavgCool | −2 | °C. |
| Maximum delta between ambient tags | TambDelta | 5 | °C. |

One or more setup screens can be presented with options for the operator to modify one or more of these constants. The "maximum working temperature" (TCmax), as used herein, is defined as a predetermined threshold or maximum safe temperature that a capacitor can operate, e.g., for at least two hours. The "warning temperature" (TCw), as used herein, is defined as a predetermined threshold or maximum normal operating temperature under normal operating conditions of a capacitor. The "maximum normalized temperature" (TNavgMax) is a predetermined threshold or maximum difference in temperature allowed between a capacitor can and the ambient temperature sensed in the same sensor array that is sensing the temperature of the capacitor can. The "maximum negative normalized temperature" (TNavgCool) is a predetermined threshold or maximum temperature difference allowed with respect to ambient when a capacitor is cooler than the ambient temperature. The "maximum delta ambient tags" (TambDelta) is a predetermined threshold or maximum difference in temperature allowed between two ambient tags. The maximum delta ambient tags can be used to provide a reference point to decide if a tag is working properly. Some non-limiting examples of ranges for each of the foregoing parameters can include:

| Description | Range 1 | Range 2 | e.g. | |
|---|---|---|---|---|
| Maximum Working Temperature, TCmax | 60 to 90 | 70 to 85 | 80 | °C. |
| Warning Temperature, TCw | 50 to 80 | 60 to 75 | 70 | °C. |
| Maximum Normalized Temperature, TNavgMax | 5 to 20 | 10 to 15 | 11 | °C. |
| Maximum Negative Normalized Temperature (delta when capacitor is cooler than ambient), TNavgCool | −1 to −10 | −2 to −3 | −2 | °C. |
| Maximum delta between ambient tags, TambDelta | 1 to 7 | 3 to 5 | 5 | °C. |

With reference now to the flow chart of FIG. 5, an improved method 200 for monitoring temperature in a capacitor bank is generally described in accordance with featured embodiments. The method 200 represents an exemplary algorithm that corresponds to at least some instructions that may be executed by a controller or processor to perform any or all of the above or following described functions associated with the disclosed concepts. The instructions corresponding to the algorithm 200 can be stored on a non-transitory computer-readable medium, such as on a hard drive or other mass storage device or a memory device.

At block 201, the method 200 includes reading temperature samples from the various sensors in the sensor array 102. This may include receiving device temperature signals from one or more of the contact temperature sensors 144A-C, and receiving ambient temperature signals from one or more of the ambient temperature sensors 145A-C. In this instance, the device temperature signals received from a particular contact sensor are indicative of the temperature of one of the capacitive elements 114A-D over a predetermined period of time, whereas the ambient temperature signals received from a particular ambient sensor are indicative of an ambient temperature proximate the capacitive element over the predetermined period of time. Temperature readings (Ti) can be taken from each tag, for example, once every 5 minutes over a 60 minute interval. The step may also include logging tag ID's and time stamp information for all tags connected to each port 168.

The method 200 of FIG. 5 also includes calculating a rolling average temperature for each tag, as indicated at block 203. This may include determining a rolling average temperature (T) for selected ones (or all) of the contact temperature sensors 144A-C from device temperature signals. This may also include determining a rolling average temperature (Ta) for selected ones (or all) of the ambient temperature sensors 145A-C from ambient temperature signals. Generally speaking, a rolling average analyzes a set of data by generating a series of averages of different subsets of the full data set. In our capacitor bank implementation, for example, wherein which can be defined a series of temperature measurements and a fixed subset size. The average of each fixed subset is created over the entire data series. These individual averages can then be plotted, with the plot line connecting or representing all the fixed averages as the rolling average. In some embodiments, the rolling average temperatures are calculated for a predetermined period of time, e.g., using twelve five-minute samples for a rolling 60 minutes average. Recognizably, the time interval and number of samples in the rolling average can be varied from the foregoing example.

There are several variations possible to calculate a rolling average temperature (e.g. different time window, different frequency of samples). By way of example, and not limitation, depending on the intrinsic characteristics of the system that needs to be monitored, the ideal configuration for the system parameters can change. For example, a capacitor bank has a very slow reaction time; as such, a temperature change can take hours to reach steady state. In this situation, a relatively slow sampling rate works fine. Systems with faster temperature changes, on the other hand, would require faster temperature sampling rates and smaller windows for the calculation of the averages.

At block 205, each of the rolling average temperature values of the contact temperature sensors is evaluated to determine if any rolling average temperature value is higher than a threshold maximum working temperature TCmax (e.g., 80° C.). If it is determined that any of these rolling average temperatures is greater than the maximum working temperature TCmax (205=YES), the system responds by triggering a "disconnect event," designated generally as 207 in FIG. 5. In the illustrated example, the disconnect event 207 includes the reader 104 logging the tag IDs, temperatures, an event description, and time stamping in a dedicated event logging area in non-volatile memory, turning the disconnect output 172 off to thereby disconnect the controller 178, and turning the health status LED to red.

If it is determined that none of the rolling average temperature values are greater than the maximum working temperature TCmax (205=No), each of the rolling average temperature values of the contact temperature sensors is evaluated at 209 to determine if any of these temperature values is higher than a threshold maximum normal operating temperature, i.e., warning temperature TCw (e.g., 70° C.). If any rolling average temperature is greater than the maximum normal operating temperature (205=Yes), the system responds by triggering a "warning event," designated generally as 211 in FIG. 5. If all rolling average temperature values are below the warning temperature TCw (205=No), and the other evaluated conditions set forth in blocks 217, 219 and 223 are all false (i.e., No), a positive health condition is indicated at step 213, which may include showing a green light via the health status LED.

Block 215 of FIG. 5 indicates that the method 210 includes calculating an average normalized temperature (TNavg) for each tag and, thus, each can. The average normalized temperature TNavg may comprise the difference between the rolling average temperature of a capacitor can 114A-D (derived from device temperature signals) and the rolling average ambient temperature of that sensor array (derived from ambient temperature signals). Ambient temperature variation is one of the causes of change in device temperature. In many applications, it is necessary to eliminate this variation to identify other changes that are present. In particular, a performance change of an electric device is typically reflected by a change of the difference of temperature between the device and ambient temperature (also referred to herein as "delta of temperature"). For example, when the efficiency of an electric device becomes deteriorated, the energy losses increase, which increases the delta of temperature. Measuring the difference between the device's temperature and the ambient temperature becomes a way of determining a relative change in efficiency. This change in efficiency is a symptom of deteriorated performance that can be caused by different reasons, such as, for example, degradation of material or change in the conditions of the system. The duration and trend of this change can provide an indication of what is the root cause of the degradation. With the recording of the normalized temperature over a selected period of time, it is possible to pinpoint the root cause of the problem (e.g. differentiate between a bad capacitor and a system with harmonic content that is causing the capacitor to heat up).

A determination is then made at block 217 whether any of the average normalized temperatures is greater than a maximum normalized temperature TNavgMax (e.g., 11° C.). If any of the average normalized temperatures TNavg is greater than the maximum normalized temperature TNavgMax (217=YES), the reader 104 will trigger a warning event, as indicated at 211. This warning event may include, in a non-limiting example, turning the health status LED to amber, turning the warning output relay 174 to ON, and logging temperatures in the event data log with a time stamping and an event description. In some embodiments, only unique warning events and the disconnect event after a restart will be recorded in the data log to avoid FIFO of key information.

At block 219 it is determined if any of the average normalized temperatures TNavg is negative and less than the maximum negative normalized temperature TNavgCool (e.g., −2° C.). If any of the average normalized temperatures TNavg is less than the maximum negative normalized temperature TNavgCool (217=YES), the reader 104 will trigger a warning event, as indicated at 211. TNavg being greater than TNavgCool may be an indication that the can average temperature is lower than ambient, which is not common, and is likely that the tag is malfunctioning. This warning event may include, in a non-limiting example, turning the health status LED to amber, turning the warning output relay 174 to ON, and logging temperatures in the event data log with time stamping and a corresponding event description.

An average of the ambient rolling average temperatures without one of the ambient sensors is calculated at block 221 of FIG. 5. By way of example, TA-7 is the instantaneous rolling average temperature of tags 145B and 145C, without tag 145A. This may comprise receiving ambient temperature signals from some (but not all) of the ambient sensors, and determining therefrom a plurality of rolling average temperatures. The instantaneous average ambient rolling average temperature is based on these rolling average temperatures. Block 223 then calculates the absolute value of the difference between the rolling average temperature of the excluded ambient tag (e.g., ambient tag 145A) and the instantaneous average ambient rolling average temperature TA-7. If the absolute value is bigger than the maximum delta ambient tags TambDelta (e.g., 5° C.) (217=YES), the reader 104 will trigger a warning event, as indicated at 211. If the calculated absolute value is greater than TambDelta, it is likely that this ambient tag is malfunctioning (e.g., the ambient tag is differing by more than 5 degrees from the average). In this case, the warning event includes turning the health status LED to amber, the warning output relay 174 being turned ON, and recording temperatures in the event data log with time stamping and a proper event description. Blocks 221 and 223 can be performed for the other ambient tags.

In general, when the reader 104 triggers a disconnect event, the health status LED is turned red, the disconnect output 172 is turned OFF (open), and temperatures are recorded in the event data log with time stamping and a description of the event. This may include logging any of the rolling average temperatures that are greater than the predetermined maximum working temperature, and logging a designation of any first sensor associated with a rolling average temperature that is greater than the predetermined maximum working temperature. In some embodiments, the reader can continue to log data from all tags for 24 hours after the disconnect event, and then stop and freeze all the data logging activity, temperature readings, and evaluations until a restart is performed. A "restart event" may include turning the health status LED to amber, turning the disconnect output 172 ON (close), turning the warning output 174 OFF (open), and recording temperatures in the event data log with time stamping and a restart event description. At this juncture, the reader 104 can start a fresh calculation cycle and resume data logging activity. It may be preferable, in case of a loss of power, that the reader 104 have enough power capacity (or "ride through time") to record the event and shut down safely. When the reader 104 triggers a "control power loss eventm," the disconnect output 172 can be turned OFF, the warning output 174 can be turned OFF, and temperatures can be recorded in the event data log with time stamping and an event description.

In some embodiments, the method 200 of FIG. 2 includes at least those blocks enumerated above. It is also within the scope and spirit of the present disclosure to omit blocks, include additional blocks, and/or modify the order of the blocks presented. It should be further noted that the method 200 represents a single sequence; however, it is expected that the method 200 be applied in a repetitive and/or systematic manner.

Three types of data logs can be stored in a non-volatile memory. The first type of data log can capture the individual real-time values coming from the tags corresponding to the daily maximum instantaneous normalized temperatures for each port. The reader 104 can then calculate (e.g., every five minutes) an instantaneous normalized temperatures Tni. From these values, the reader 104 can identify a maximum overall instantaneous normalized temperature for the tags and store the quantities for all the tags. These values can then be compared (e.g., every 24 hours) to a new value logged, for example, every five minutes. If the new value is bigger, the old maximum value is replaced by the new maximum together with the rest of the tags. At the end of the day, this log will have the maximum instantaneous temperatures of the hottest tag of the port that was associated with the maximum instantaneous normalized temperature. In other words, this log captures the daily maximum of the hottest tag in the port, as well as the temperature on the other tags at that same time. Accordingly, the method 200 of FIG. 5 may further comprise: receiving from a plurality of sensors a plurality of device temperature signals indicative of temperatures of a plurality of capacitive elements in the capacitor bank; determining from the plurality of device temperature signals a daily maximum instantaneous normalized temperature for each of the capacitive elements; and identifying a largest one of the daily maximum instantaneous normalized temperatures and the sensor and the capacitive element associated therewith.

The second and third logs are the event logs. This can be a single log that captures data relative to an event as defined previously. Warning events can be recorded once per reason (e.g., only when a new warning appears). For example, if the reader 104 triggers a warning event indicating that TNavg-Max was exceeded, this event will be recorded only once (the first occurrence). The following occurrences of the same type of event will be ignored in the data log until a restart is applied. These logs can be of the first-in-first-out (FIFO) nature.

The reader 104 can also provide a command interface, which can be used to issue commands that perform various operations such as download logs into a computer, restart operations, and setup operations. The following commands, singly or in any logical combination, can be supported: (1) Soft Restart—causes the unit to restart calculations and logging; (2) Factory Default Reset—causes the unit to return to factory configurations, clearing all non-volatile logs, setting the configuration parameters to factory defaults, and re-starting calculations; (3) Initialization—this command will clear all logs and start new calculations, but will not change configuration parameters; (4) Disconnect Override—this command will turn the disconnect output 172 to ON, forcing the capacitor bank 110 to connect; (5) Disconnect—this command will turn the disconnect output 172 to OFF, forcing the capacitor bank 110 to disconnect; (6) Read Sample—this command will force a reading in all ports independent of any preset time intervals; and (7) Time Synch. The reader 107 can also support firmware upgrades, for example, using the communications port and a computer.

The reader 104 may also have a non-volatile clock. The reader 104 can thus provide time stamping information for the real-time readings and onboard logging records. This time stamping can be generated from a real-time clock or a timer with firmware that emulates a real-time clock. The real-time clock can be backed up by a dedicated battery, so in the event of a power loss, the real time clock can continue to function.

Figure 6:
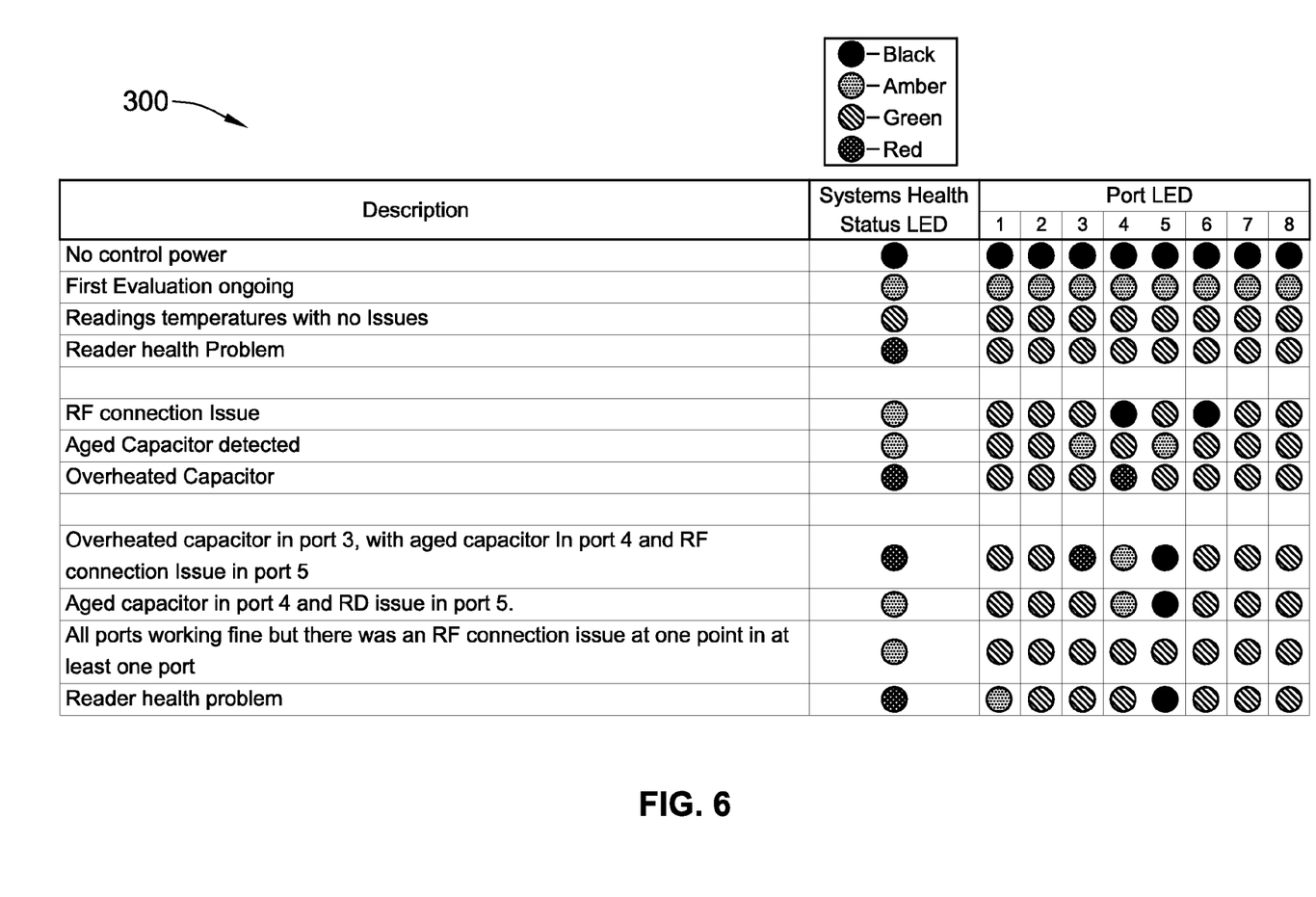
FIG. 6 is a table illustrating a representative status indicator summary in accordance with aspects of the present disclosure.

FIG. 6 is a table 300 illustrating a representative status indicator summary in accordance with aspects of the present disclosure. In general, the LED's illustrated in FIG. 5 can be operated to summarize the status of the reader 104. As noted above, the LED can have a connection for a remote LED indicator, which acts as a mechanical interface for attaching a fiber optic accessory, such that light can be located remotely (e.g., 10 ft.) from the reader 104. The OFF status is real-time and can change to any color without pressing restart button. Some of the colors and conditions that the health status LED can indicate include: OFF—no control power present in the unit; GREEN—control power present, good reader health, no events to announce; AMBER—there is a warning condition in at least one of the ports; RED—the cabinet has been disconnected due to a disconnect event or a hardware/firmware issue. If disconnect event occurred, there should be at least one port showing a RED LED; otherwise, there was a hardware or firmware problem.

Some of the algorithms presented herein evaluate the absolute temperature and the average normalized temperature eliminating the environment variations over some pre-determined period of time (e.g., 5 minutes). Different decisions can be made based on these two values. The end result can be an LED status indicator that represents the system status. In addition, these indicators can drive a related output to change the condition of the device being monitored (e.g., turn off the entire capacitor bank, turn off a step in the capacitor bank, or turn off an individual capacitor) and/or send a reporting message to a remote system.

Aspects of this disclosure provide simple and cost-effective methods, systems and devices for monitoring capacitor banks. However, many of the features presented herein are applicable to other systems and devices. Some of the advantages provided by the features of the present disclosure include early detection of capacitors that are not operating as effectively as desired, which can lead to more efficient power use and a lower electrical bill. Other benefits include early detection of capacitors whose electrical characteristics are exhibiting a trend toward a failure, thereby reducing potential operational concerns and damage to the rest of the capacitor bank. In addition, aspects of the present disclosure help minimize the need for regular manual inspection of capacitor banks, which reduces labor costs and provides for proactive notification to the customer and/or manufacturer of capacitors that require maintenance.

Aspects of this disclosure may be implemented, in some embodiments, through a computer-executable program of instructions, such as program modules, generally referred to as software applications or application programs executed by a computer. The software may include, in non-limiting examples, routines, programs, objects, components, and data structures that perform particular tasks or implement particular abstract data types. The software forms an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, the numerous aspects of the present disclosure may be practiced with a variety of computer-system and computer-network configurations, including hand-held devices, multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

While particular embodiments and applications of the present disclosure have been illustrated and described, it is to be understood that this disclosure is not limited to the precise construction and compositions disclosed herein and that various modifications, changes, and variations can be apparent from the foregoing descriptions without departing from the spirit and scope of the invention as defined in the appended claims.

What is claimed is:

1. A method of monitoring temperature in an electrical distribution system for transmitting electrical power generated by a utility company, the method comprising:
receiving from a first sensor a first set of temperature signals indicative of a temperature of a first electrical-power-transmitting device in the electrical distribution system over a predetermined period of time;
receiving from a second sensor a second set of temperature signals indicative of a temperature of a second electrical-power-transmitting device in the electrical distribution system over the predetermined period of time;
determining a first rolling average temperature for the first device for the predetermined period of time from the first set of temperature signals, the first rolling average temperature including a first series of averages comprising a respective average for each of a plurality of subsets of temperature signals within the first set of temperature signals;
determining a second rolling average temperature for the second device for the predetermined period of time from the second set of temperature signals, the second rolling average temperature including a second series of averages comprising a respective average for each of a plurality of subsets of temperature signals within the second set of temperature signals; and
triggering a disconnect event in response to a determination that either the first rolling average temperature or the second rolling average temperature is greater than a predetermined maximum working temperature.

2. The method of claim 1, further comprising triggering a warning event in response to (a) a determination that the first and second rolling average temperatures are less than the predetermined maximum working temperature, and (b) a determination that either the first rolling average temperature or the second rolling average temperature is greater than a predetermined maximum normal operating temperature.

3. The method of claim 1, further comprising:
receiving from an ambient sensor ambient temperature signals indicative of an ambient temperature proximate the first and second devices over the predetermined period of time;
determining an ambient rolling average temperature for the predetermined period of time from the ambient temperature signals;
determining a first average normalized temperature from a difference between the first rolling average temperature and the ambient rolling average temperature;
determining a second average normalized temperature from a difference between the second rolling average temperature and the ambient rolling average temperature; and
triggering a warning event in response to a determination that the first average normalized temperature or the second average normalized temperature is greater than a maximum normalized temperature.

4. The method of claim 3, further comprising triggering the warning event in response to a determination that either first average normalized temperature or the second average normalized temperature is less than a predetermined maximum negative normalized temperature.

5. The method of claim 3, further comprising:
receiving from a plurality of ambient sensors a plurality of ambient temperature signals indicative of ambient temperatures proximate a plurality of temperature-sensitive devices in the system;
determining a plurality of rolling average temperatures from the plurality of ambient temperature signals;
determining an instantaneous average ambient rolling average temperature from the plurality of rolling average temperatures;
determining an absolute value of a difference between the ambient rolling average temperature of the ambient senor and the instantaneous average ambient rolling average temperature of the plurality of ambient sensors; and
triggering the warning event in response to a determination that the absolute value is greater than a predetermined maximum delta ambient tags.

6. The method of claim 3, wherein the warning event includes outputting a warning indication and storing in a memory device the average normalized temperature and a timestamp associated with the triggering of the warning event.

7. The method of claim 1, wherein the disconnect event includes disconnecting at least one of the devices from an external electrical system.

8. The method of claim 1, wherein the disconnect event includes storing in a memory device:
any of the first and second rolling average temperatures that are greater than the predetermined maximum working temperature;
a designation of the first sensor if the first rolling average temperature is greater than the predetermined maximum working temperature;
a designation of the second sensor if the second rolling average temperature is greater than the predetermined maximum working temperature; and
a timestamp associated with the triggering of the disconnect event.

9. The method of claim 1, further comprising:
automatically identifying a plurality of sensor assemblies and a plurality of temperature sensors present in the system, the plurality of temperature sensors including the first and second sensors; and
for each of the sensor assemblies, automatically identifying a respective combination of which of the temperature sensors are associated with the sensor assembly.

10. The method of claim 9, further comprising triggering a warning event in response to a determination that one of the identified combinations of sensors does not correspond to a predetermined expected sensor combination.

11. The method of claim 1, wherein the first sensor comprises a plurality of temperature sensors, the method further comprising:
receiving from the plurality of temperature sensors a plurality of temperature signals indicative of temperatures of a plurality of devices in the system;
determining from the plurality of device temperature signals a daily maximum instantaneous normalized temperature for each of the devices; and
identifying a largest one of the daily maximum instantaneous normalized temperatures and the sensor and the device associated therewith.

12. The method of claim 1, further comprising storing in a memory device an event log including data identifying a type of each triggered event, a timestamp associated with each triggered event, and predetermined temperature readings associated with each triggered event.

13. The method of claim 1, further comprising:
illuminating a first color of a light emitting diode assembly (LED) in response to a determination that the temperature in the system is normal;
illuminating a second color of the LED assembly in response to a determination that an abnormal event occurred and the system is operating safely; and
illuminating a third color of the LED assembly in response to the triggering of the disconnect event.

14. A temperature monitoring system for a capacitor bank with a plurality of capacitor cans in an electrical distribution system for transmitting electrical power generated by a utility company, the monitoring system comprising:
a plurality of contact temperature sensors, each of the contact temperature sensors being configured to contact a surface of a respective one of the capacitor cans and therefrom generate a respective set of signals indicative of a temperature of the respective capacitor can over a predetermined period of time; and
a reader device operatively connected to the plurality of contact temperature sensors, the reader device being configured to:
receive the signals from the plurality of contact temperature sensors;
determine, for each of the contact temperature sensors, a rolling average temperature from the respective set of signals received from the contact temperature sensor, each of the rolling average temperatures including a respective series of averages comprising a respective average for each of a plurality of subsets of signals within the respective set of signals;
determine if any of the rolling average temperatures is greater than a predetermined maximum working temperature; and
trigger a disconnect event from the electrical distribution system in response to a determination that any of the rolling average temperatures is greater than the predetermined maximum working temperature.

15. The temperature monitoring system of claim 14, wherein, responsive to a determination that none of the rolling average temperatures is greater than the predetermined maximum working temperature, the reader device is further configured to:
determine if any of the rolling average temperatures is greater than a predetermined maximum normal operating temperature; and
trigger a warning event in response to a determination that any of the rolling average temperatures is greater than the predetermined maximum normal operating temperature.

16. The temperature monitoring system of claim 14, further comprising an ambient temperature sensor operatively connected to the reader device and configured to generate a signal indicative of an ambient temperature proximate at least one of the capacitor cans in the capacitor bank, wherein the reader device is further configured to:
receive the signals from the ambient temperature sensor;
determine an ambient rolling average temperature from the signals received from the ambient temperature sensor;
determine, for each of the contact temperature sensors, a respective average normalized temperature comprising the respective rolling average temperature of the contact temperature sensor minus the ambient rolling average temperature; and
triggering a warning event in response to a determination that any of the average normalized temperatures is greater than a maximum normalized temperature.

17. The temperature monitoring system of claim 16, wherein the reader device is further configured to trigger the warning event in response to a determination that any of the average normalized temperatures is less than a predetermined maximum negative normalized temperature.

18. A capacitor bank, comprising:
a cabinet;
a first set of tandem capacitor cans housed by the cabinet;
a second set of tandem capacitor cans housed by the cabinet and arranged generally parallel to the first set of tandem capacitor cans;
a temperature sensor assembly interposed between the first and second sets of capacitor cans, the temperature sensor assembly including an ambient temperature sensor and a plurality of contact temperature sensors, each of the contact temperature sensors being in direct contact with a surface of a respective one of the capacitor cans to generate therefrom a respective set of signals indicative of a temperature of the respective capacitor can; and
a reader device communicatively coupled to the temperature sensor assembly, the reader device including a processor and a memory device storing instructions to perform the following operations:
receive signals from the plurality of contact temperature sensors;
determine, for each of the contact temperature sensors, a respective rolling average temperature from the respective set of signals received from the contact temperature sensor, each of the rolling average temperatures including a respective series of averages comprising a respective average for each of a plurality of subsets of signals within the respective set of signals;
determine if any of the rolling average temperatures is greater than a predetermined maximum working temperature;
determine if any of the rolling average temperatures is greater than a predetermined maximum normal operating temperature;
trigger a disconnect event in response to a determination that any of the rolling average temperatures is greater than the predetermined maximum working temperature; and
trigger a warning event in response to a determination that all of the rolling average temperatures are less than the predetermined maximum working temperature and any of the rolling average temperatures is greater than the maximum normal operating temperature.

19. The method of claim 1, wherein the first set of temperature signals is indicative of a first series of temperature measurements of the first device, the second set of temperature signals is indicative of a second series of temperature measurements of the second device, and wherein the subsets of temperature signals within the first and second sets of temperature signals share a fixed subset size.

20. The method of claim 1, wherein the first rolling average temperature is determined by plotting the averages of the plurality of subsets within the first set of temperature signals, and the second rolling average temperature is determined by plotting the averages of the plurality of subsets within the second set of temperature signals.

* * * * *